(12) United States Patent
Andresen

(10) Patent No.: US 10,060,708 B2
(45) Date of Patent: Aug. 28, 2018

(54) PROTECTIVE GARMENTS

(71) Applicant: Lars Petter Andresen, Oslo (NO)

(72) Inventor: Lars Petter Andresen, Oslo (NO)

( * ) Notice: Subject to any disclaimer, the term of this patent is extended or adjusted under 35 U.S.C. 154(b) by 88 days.

(21) Appl. No.: 15/595,811

(22) Filed: May 15, 2017

(65) Prior Publication Data

US 2017/0248391 A1    Aug. 31, 2017

Related U.S. Application Data

(63) Continuation-in-part of application No. 15/454,834, filed on Mar. 9, 2017, which is a continuation-in-part
(Continued)

(51) Int. Cl.
*A41D 1/04* (2006.01)
*F41H 5/04* (2006.01)
(Continued)

(52) U.S. Cl.
CPC ............. *F41H 5/0464* (2013.01); *A41D 1/04* (2013.01); *A41D 1/06* (2013.01); *A41D 3/00* (2013.01); *A41D 13/018* (2013.01); *A41D 13/065* (2013.01); *A41D 19/0006* (2013.01); *A41D 19/01511* (2013.01); *A41D 19/01523* (2013.01); *A41D 31/005* (2013.01); *A41D 31/0061* (2013.01); *A42B 3/063* (2013.01); *A43B 7/32* (2013.01); *B32B 5/024* (2013.01); *B32B 5/028* (2013.01); *B32B 5/26* (2013.01); *B32B 25/10* (2013.01); *B32B 25/14* (2013.01);
(Continued)

(58) Field of Classification Search
CPC .... F41H 1/02; A41D 1/04; A41D 1/06; A41D 19/01511; A41D 31/0061
See application file for complete search history.

(56) References Cited

U.S. PATENT DOCUMENTS 5,113,532 A * 5/1992 Sutton ................ A41D 19/0058
2/16
5,200,256 A * 4/1993 Dunbar ................... B32B 15/14
109/49.5
(Continued)

FOREIGN PATENT DOCUMENTS

WO    WO2014/107518    1/2014

*Primary Examiner* — Shaun R Hurley
*Assistant Examiner* — Andrew W Sutton
(74) *Attorney, Agent, or Firm* — r.r (princeton); Roy Rosser

(57) ABSTRACT

Garments made from a composite, protective fabric are disclosed. The composite fabric has textile layers placed in proximity to metallic mesh layers of woven stainless steel mesh. The metal mesh layers formed from any metal which forms suitable fibers. The textile layers are fabric formed with well-known fabric fibers selected from those including para-aramid fibers, meta-aramid fibers, ultra-high molecular weight polyethylene fibers, polyethylene terephthalate fibers, cellulose fibers, polyamide fibers, a mixture of para-aramid fibers and meta-aramid fibers, and a mixture of para-aramid fibers and carbon fibers. Forming the non-metal textile layers is by any suitable method for interlacing yarns including weaving, knitting, crocheting, knotting, or felting, or combinations thereof. The garments made using the fabric include gloves, bullet proof vests and chain-saw resistant trousers.

8 Claims, 7 Drawing Sheets

Related U.S. Application Data of application No. 14/992,829, filed on Jan. 11, 2016, now Pat. No. 9,644,923, which is a continuation-in-part of application No. 14/791,059, filed on Jul. 2, 2015.

(51) Int. Cl.

| | | |
|---|---|---|
| *A41D 19/015* | (2006.01) | |
| *A41D 1/06* | (2006.01) | |
| *A41D 31/00* | (2006.01) | |
| *A41D 13/06* | (2006.01) | |
| *A41D 3/00* | (2006.01) | |
| *A43B 7/32* | (2006.01) | |
| *A42B 3/06* | (2006.01) | |
| *A41D 19/00* | (2006.01) | |
| *F41H 1/02* | (2006.01) | |
| *B32B 5/02* | (2006.01) | |
| *B32B 5/26* | (2006.01) | |
| *B32B 25/10* | (2006.01) | |
| *B32B 25/14* | (2006.01) | |
| *A41D 13/018* | (2006.01) | |
| *F41H 1/08* | (2006.01) | |

(52) U.S. Cl.
CPC .............. *F41H 1/02* (2013.01); *F41H 1/08* (2013.01); *A41D 2500/10* (2013.01); *A41D 2500/20* (2013.01); *A41D 2500/52* (2013.01); *B32B 2262/0253* (2013.01); *B32B 2262/0276* (2013.01); *B32B 2262/103* (2013.01); *B32B 2307/56* (2013.01); *B32B 2307/581* (2013.01); *B32B 2571/02* (2013.01)

(56) References Cited

U.S. PATENT DOCUMENTS

| | | | | |
|---|---|---|---|---|
| 5,564,127 | A * | 10/1996 | Manne | A61B 42/10 2/161.7 |
| 6,457,182 | B1 * | 10/2002 | Szczesuil | A41D 19/01511 2/16 |
| 6,581,212 | B1 * | 6/2003 | Andresen | A41D 19/01511 139/425 R |
| 9,644,923 | B2 | 5/2017 | Andresen | |
| 2005/0050619 | A1 * | 3/2005 | Dunn | A41D 31/0027 2/458 |
| 2006/0277651 | A1 * | 12/2006 | Razzaghi | A41D 13/0002 2/81 |
| 2008/0307553 | A1 | 12/2008 | Jbeiliet | |
| 2009/0222980 | A1 * | 9/2009 | Klug | A41D 19/01529 2/455 |
| 2009/0255022 | A1 * | 10/2009 | Smith | B29C 43/20 2/2.5 |
| 2010/0275342 | A1 * | 11/2010 | Sweeney | A41D 19/01505 2/167 |
| 2012/0079640 | A1 * | 4/2012 | Carlston | A63B 71/14 2/2.5 |
| 2012/0180196 | A1 * | 7/2012 | Tock | A41B 11/02 2/239 |
| 2012/0185997 | A1 * | 7/2012 | Kirk, II | A62B 17/006 2/161.7 |
| 2014/0260937 | A1 * | 9/2014 | Whitaker | F41H 5/013 89/36.02 |
| 2014/0283273 | A1 * | 9/2014 | Falken | A41D 13/012 2/2.15 |
| 2015/0164158 | A1 * | 6/2015 | Veillet | A41D 19/015 2/161.6 |
| 2015/0203995 | A1 * | 7/2015 | Adams | D03D 1/0035 2/455 |
| 2017/0138513 | A1 | 5/2017 | Andresen | |

* cited by examiner

PROTECTIVE GARMENTS

CROSS-REFERENCE TO RELATED APPLICATIONS

This application is a Continuation-in-Part of U.S. patent application Ser. No. 15/454,834 entitled "Protective Garments" filed on Mar. 9, 2017, which in turn is a Continuation-in-Part of US patent application Ser. No. 14/992,829 entitled "Composite, Protective Fabric and Garments made thereof" file on Jan. 11, 2016, which in turn is a Continuation-in-Part of U.S. patent application Ser. No. 14/791,059 entitled "Stretchable Metal Mesh Protective Material and Garments" filed on 2 Jul. 2015, the contents of all of which are hereby fully incorporated by reference in their entirety.

BACKGROUND OF THE INVENTION (1) Field of the Invention

The invention relates to garments made from a composite fabric having superior cut and puncture resistance, and more particularly to garments made from a fabric having a combination of layers of metal mesh and textile layers of woven, non-metallic fibers, the non-metallic fibers including ones selected from the group of meta-aramid fibers, ultra-high molecular weight polyethylene fibers, polyethylene terephthalate fibers, a cellulose fibers, polyamide fibers, mixtures of para-aramid fibers and meta-aramid fibers and mixtures of para-aramid fibers and carbon fibers.

(2) Description of Related Art

Protective garments made from fabrics woven from para-aramid synthetic fibers such as, but not limited to, Kevlar™, Honeywell Spectra™, Dynea™, Black Kevlar™ and combinations thereof, display exceptional resistance to ballistic puncture and have been used successfully to construct light weight, bullet proof body armor. Other materials such as, but not limited to, Nomex™ show exceptional resistance to heat and are used in fire-resistant garments for personal such as, but not limited to, fire-fighters, race car drivers and military flight crew. The materials are, however, only of average resistance to cut and slash attacks and to puncture by needles. The garments constructed from such materials, such as, but not limited to, para-aramid based body armor, therefore, provide good protection against gun attacks, but are not particularly effective against knife or needle threats.

What is needed are garments made from a light-weight fabric that provides a combination of high resistance to ballistic puncture or heat or chemical attack as well as to cut and slash attacks and to puncture attacks. It is also desirable that such fabric combinations may be readily used to fabricate light weight, flexible garments such as, but not limited to, gloves and other attack proof garments.

The relevant prior art includes:

U.S. Pat. No. 6,581,212 issued to Andresen on Jun. 24, 2003 entitled "Protective garment" that describes a protective garment for protection of body parts against cuts or puncture wounds comprising an inner layer, a protective layer and an outer layer, the protective layer being composed of a wire mesh of woven metal wires, the thickness of the metal wires being between 0.03 mm and 0.20 mm and the apertures in the wire mesh being between 0.05 mm and 0.45 mm.

U.S. patent application Ser. No. 20080307553 submitted by Terrance Jbeili et al. published on Dec. 18, 2008 entitled "Method and Apparatus for Protecting against Ballistic Projectiles" that describes a composite material comprising a multitude of masses and fibers supported on a flexible substrate arranged in a manner to absorb energy from a ballistic projectile and thereby protect persons or property from ballistic injury or damage. An array of small, tough disc-like masses are suspended in a three dimensional cradle of high-tensile elastomeric fibers such that energy from an incoming ballistic projectile is first imparted to one or more masses and the motion of the masses are restrained by tensile strain of elastomeric fibers substantially in the direction of travel of the incoming projectile. The projectile is eventually decelerated to harmless velocity through a combination of transfer of momentum to the masses and the elastic and plastic tensile deformation of the fibers. One or more layers of the composite material can be assembled to form body protective armor ("bullet-proof vest") or property protective armor, the number and characteristics of the layers being adjusted according to the specific ballistic threat anticipated.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

Inventive protective garments, made from novel, composite, protective fabrics, are disclosed.

In a preferred embodiment, a human wearable, protective garment may be made from a composite fabric in which metal mesh layers are placed in proximity of non-metal textile layers.

The metal mesh layers, may, for instance, be formed from any metal which suitable fibers may be formed, such as, but not limited to, Aluminum, Beryllium, Chromium, Cobalt, Copper, Erbium, Gold, Indium, Iron, Lead, Nickel, Platinum, Silver, Tantalum, Tin, Tungsten, Uranium, Zinc, and Zirconium, or some combination thereof, or alloys formed thereof.

The non-metal textile layers may, for instance, be fabric formed from fibers that include well-known fabric fibers such as, but not limited to, a para-aramid fiber, a meta-aramid fiber, an ultra-high molecular weight polyethylene fiber, a polyethylene terephthalate fiber, a cellulose fiber, a polyamide fiber, a mixture of para-aramid fibers and meta-aramid fibers, and a mixture of para-aramid fibers and carbon fibers.

Forming the non-metal textile layers may, for instance, be formed by any suitable method for interlacing yarns such as, but not limited to, weaving, knitting, crocheting, knotting, or felting.

The potential effectiveness of such combinations may be illustrated by the example in which the fibers of the textile layer are para-aramid fibers. When such a textile layer was placed in proximity to a layer of stainless steel mesh, it was found to produce a composite material having the surprising property of a puncture resistance that is 30%-40% greater than that expected from a linear combination of the cut and puncture resistance properties of each individual layer, while maintaining the combined ballistic and needle protection of each layer. Combining fabric layers made of other well-known fabric fibers may, therefore, produce similarly surprisingly enhanced combined protective properties.

In a preferred embodiment garments may be made in which one or more textile layers may be placed in proximity with one or more metal mesh layers and sandwiched between inner and outer protective layers that may be joined at their periphery.

In a preferred embodiment, the textile layers may be made of fibers that are 10 dtex or less, while the metal mesh layer 125 are preferably woven from stainless steel fibers having a diameter of 0.2 mm or less and may have a mesh aperture of 0.45 mm or less.

In a further preferred embodiment of the invention, the composite fabric may have at least three layers and be in the form of a metal mesh layer sandwiched between a first-textile layer and a second-textile layer. The fibers in the first-textile layer may, for instance, be well-known fabric fibers such as, but not limited to, a para-aramid fiber, a meta-aramid fiber, an ultra-high molecular weight polyethylene fiber, a polyethylene terephthalate fiber, a cellulose fiber, a polyamide fiber, a mixture of para-aramid fibers and meta-aramid fibers, and a mixture of para-aramid fibers and carbon fibers, while the fibers in the second-textile layer may be any one of that group other than the one used in the first-textile layer.

As described in more detail below, the number and arrangement of the first-textile layers, the second-textile layers, and metallic mesh layers may be adjusted in various ways to suit the material for its use in the manufacture of various wearable protective garments such as, but not limited to, gloves, attack resistant vests, protective trousers, protective leggings, a knee protection devices, protective sleeves, "chain saw" pants, protective vests, helmets and headgear, protective jackets and protective shoes.

Therefore, the present invention succeeds in conferring the following, and others not mentioned, desirable and useful benefits and objectives.

It is an object of the present invention to provide improved wearable protective garments capable of a combination of properties such as high level ballistic, cut and slash, puncture and needle protection and heat protection.

It is another object of the present invention to provide cost effective, lightweight materials for protective garments.

DETAILED DESCRIPTION OF THE INVENTION

Figure 1A:
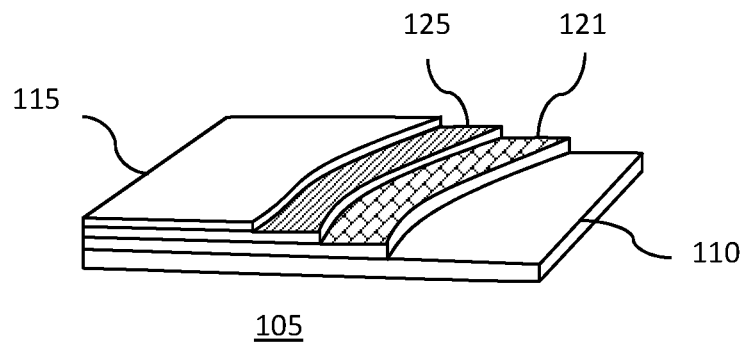
FIG. 1A shows a schematic cut-away isometric view of the layers of a protective, composite fabric of one embodiment of the present invention.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto.

FIG. 1 shows a schematic cut-away isometric view of the layers of a protective, composite fabric 105 of one embodiment of the present invention.

The protective, composite fabric 105 may, for instance, have a first-textile layer 121 adjacent to a metal mesh layer 125 with both layers sandwiched between an outer protective layer 115 and an inner protective layer 110. The inner and outer protective layers may be any fabric suitable for wearing in a garment such as, but not limited to, a fabric formed from cotton, wool, silk, linen, polyester or some combination thereof.

In a preferred embodiment, the first-textile layer 121 is preferably formed using yarn comprised of fibers that are either meta-aramid fibers, an ultra-high molecular weight polyethylene fiber, a polyethylene terephthalate fiber, a cellulose fiber, a polyamide fiber, a mixture of para-aramid fibers and meta-aramid fibers, and a mixture of para-aramid fibers and carbon fibers. In a more preferred embodiment the fibers are 10 dtex or less, and in a most preferred embodiment the fibers are 2 dtex or less.

The textile layers may, for instance, be formed by any suitable method of interlacing yarns such as, but not limited to, weaving, knitting, crocheting, knotting, or felting, or some combination thereof.

Meta-aramid fibers are well-known and sold by, for instance, E. I. du Pont de Nemours and Company of Wilmington, Del. under the tradename NOMEX™. There chemical composition is poly (meta-phenylene issophthalamide). They are related to para-aramid fibers, also sold by du Pont, under the tradename Kevlar™, and which have the chemical composition poly (para-phenylene terephthalamide. Para-aramids are described in more detail in, for instance, U.S.

Pat. No. 9,644,923 issued to Andresen on May 9, 2017 entitled "Composite, protective fabric and garments made thereof", the contents of which are hereby incorporated by reference in their entirety.

Ultra-high molecular weight polyethylene fibers are sold by, for instance, Honeywell International Inc. of Morristown, N.J. as Honeywell Spectra™ Fibers, and by Koninklijke DSM N.V of Heerlen, Netherlands as Dyneema™ fiber.

Ultra-high molecular weight polyethylene fibers produce lightweight high-strength materials. They have yield strengths as high as 2.4 GPa (350,000 psi) and specific gravity as low as 0.97. High-strength steels have comparable yield strengths, and low-carbon steels have yield strengths much lower (around 0.5 GPa). Since steel has a specific gravity of roughly 7.8, this gives strength-to-weight ratios for these materials in a range from 8 to 15 times higher than steel.

The fibers are used in armor, in particular, personal armor and on occasion as vehicle armor and cut-resistant gloves.

Polyethylene terephthalate fibers are known generically as polyester fibers and are sold by, for instance, US Fibers of Trenton, S.C.

Cellulose fibers are both naturally occurring fibers and are produced synthetically. Naturally occurring fibers include cotton and hemp fibers, with hemp fibers being woven into fabrics such as linin. Synthetic cellulose fibers are known generically as rayon and are sold by, for instance Grasim Industries Ltd. of Mumbai, India as Viscose Staple Fibre™.

Polyamide fibers are known generically as nylon, and various polyamide polymer fibers are sold by a variety of companies including by E. I. du Pont de Nemours and Company of Wilmington, Del. under the tradename of Elvamide™.

Mixtures of para-aramid fibers and meta-aramid fibers are not well-known but the aramids are well-known and sold by, for instance, E. I. du Pont de Nemours and Company of Wilmington, Del. under the tradenames Kevlar™ and Nomex™. Because of their strength and resistance to heat the materials are often used, though typically in separate layers, in protective clothing such as fire fighter suits, race car driver suits and air force pilot suits.

Materials woven from fibers that are a mixture of para-aramid fibers and carbon fibers are well-known and sold by, for instance, E. I. du Pont de Nemours and Company of Wilmington, Del. under the tradename Black Kevlar.

The metal mesh layer 125 may be made from any metal that may form a useful fiber such as, but not limited to, Aluminum, Beryllium, Chromium, Cobalt, Copper, Erbium, Gold, Indium, Iron, Lead, Nickel, Platinum, Silver, Tantalum, Tin, Tungsten, Uranium, Zinc, and Zirconium, or some combination thereof, or some alloy thereof.

The metal mesh may, for instance, be formed by any suitable method of interlacing yarns such as, but not limited to, weaving, knitting, crocheting, knotting, or felting, or some combination thereof.

In a preferred embodiment of the present invention, the mesh is preferably a woven metallic mesh, and more preferably a woven mesh of stainless steel fibers having a diameter of 0.2 mm or less and a mesh aperture of 0.45 mm or less. Such a mesh has been found to have good resistance to cut and slash penetration and to needle stick penetration, and has been used in protective garments such as, but not limited to, protective gloves, as described in, for instance, U.S. Pat. No. 6,581,212 issued to Andresen on Jun. 24, 2003, the contents of which are hereby incorporated by reference in their entirety.

In a preferred embodiment, the first-textile layer 121 and the metal mesh layers 125 may be sandwiched between an outer protective layer 115 and an inner protective layer 110, and the inner and outer protective layers may be joined at a periphery of a garment piece by, for instance, stitching or by some other joining mechanism such as, but not limited to, gluing, welding, stapling or some combination thereof.

The outer protective layer 115 may also or instead be comprised of a liquid barrier material such as, but not limited to, a latex, a neoprene, a nitrile or a vinyl, or some combination thereof.

Figure 1B:
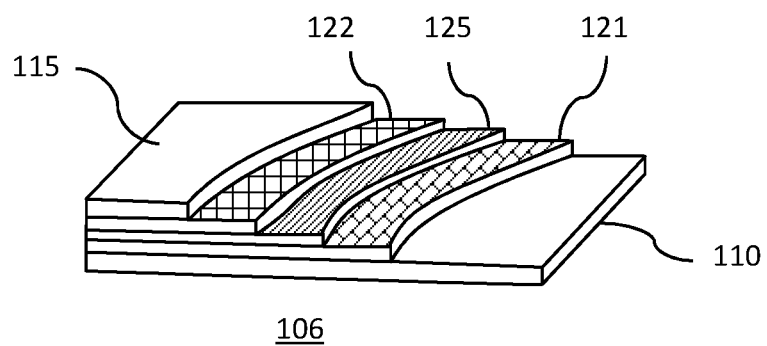
FIG. 1B shows a schematic cut-away isometric view of the layers of a protective, composite fabric of a further embodiment of the present invention.

FIG. 1B shows a schematic cut-away isometric view of the layers of a protective, composite fabric of a further embodiment of the present invention.

The bi-textile protective, composite fabric 106, as shown in FIG. 1B, may have a metal mesh layer 125 sandwiched between a first-textile layer 121 and a second-textile layer 122. That sandwich may then, in turn, be sandwiched between an inner protective layer 110 and a outer protective layer 115.

The fibers in the first-textile layer 121 may, for instance, be well-known fabric fibers such as, but not limited to, a para-aramid fiber, a meta-aramid fiber, an ultra-high molecular weight polyethylene fiber, a polyethylene terephthalate fiber, a cellulose fiber, a polyamide fiber, a mixture of para-aramid fibers and meta-aramid fibers, and a mixture of para-aramid fibers and carbon fibers, while the fibers in the second-textile layer 122 may be any one of that group other than the one used in the first-textile layer.

Figure 2A:
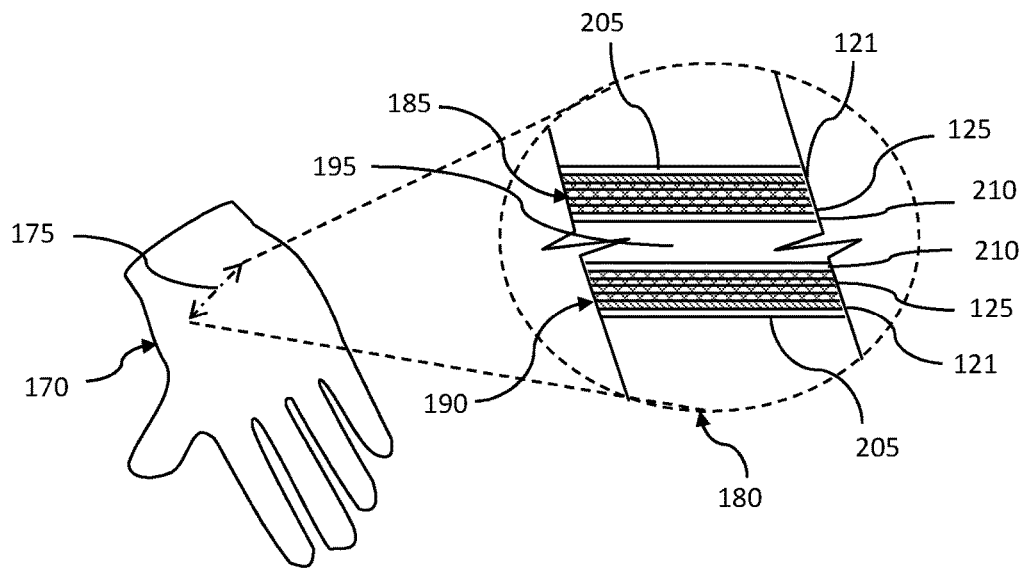
FIG. 2A shows a schematic plan view of a protective glove of one embodiment of the present invention, and a schematic cross-section of a selected portion of the glove.

FIG. 2A shows a schematic plan view of a protective glove 170 of one embodiment of the present invention, and a schematic cross-section of a selected portion 180 of the glove 170.

The partial cross section 180 of the glove is shown as taken on a line 175. The partial cross section 180 of a glove shows a top portion 185 of a glove and a lower portion 190 of a glove separated by a space 195 for a hand. The top portion 185 of the glove is shown as having an outer protective layer 205 and an inner protective layer 210 between which are sandwiched a plurality of metal mesh layers 125 and first-textile layers 121. The lower portion 190 of a glove is similarly shown with the metal mesh layers 125 and the first-textile layers 121 sandwiched between an outer protective layer 205 and an inner protective layer 210. In both the top and the bottom portions of the glove, the inner protective layer 210 is shown closest to the space 195 for a hand and the microflex fabric layers 120 are shown proximate to the inner protective layer 210. Such an arrangement may, for instance, provide a material well suited to resisting puncture attack from the outside of the glove.

FIG. 2A shows four metal mesh layers 125 and one first-textile layer 121. While such an arrangement may, for instance, yield an economical glove that meets certain performance levels such as, but not limited to, the EN388 test for abrasion resistance, blade cut resistance, tear resistance and puncture resistance, there may be other arrangements that may be more advantages in terms of factors such as, but not limited to, cost, performance, flexibility and comfort, or some combination thereof.

The composite material may, for instance, have a plurality of first-textile layer 121 and metal mesh layers 125 that may be alternated with each other. Such an arrangement may, for instance, increase the hypothesized synergy between the layers described above.

The composite material may, for instance, have one or more first-textile layers 121 adjacent to both the outer protective layer 205 and the inner protective layer 210 on either or both of the top portion 185 of a glove and the lower portion 190 of a glove. Such an arrangement may, for instance, increase the resistance of the inside of the glove to rupturing through flexing.

Figure 2B:
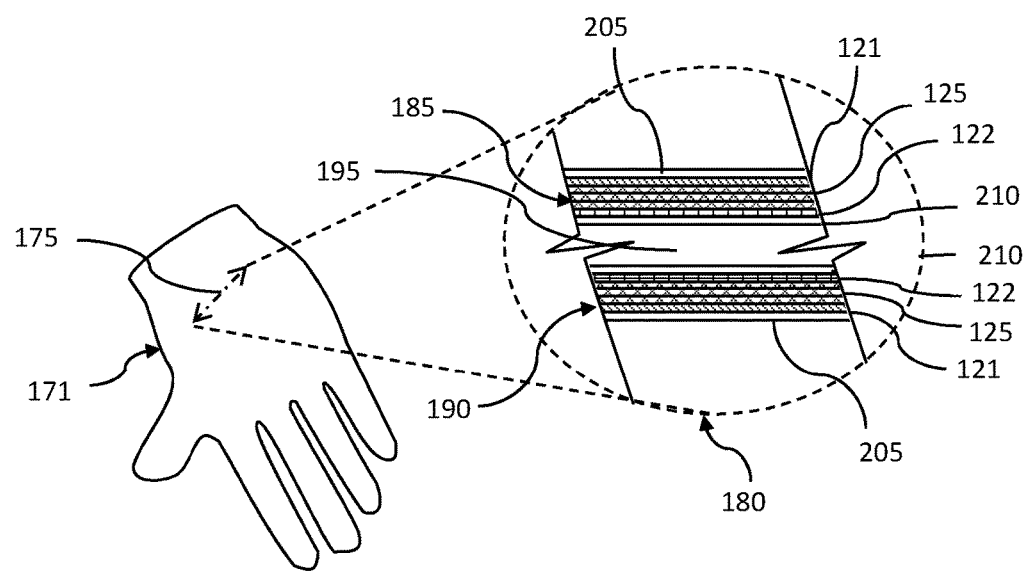
FIG. 2B shows a schematic plan view of a protective glove of a further embodiment of the present invention, and a schematic cross-section of a selected portion of the glove.

FIG. 2B shows a schematic plan view of a protective glove of a further embodiment of the present invention, and a schematic cross-section of a selected portion of the glove.

protective glove 171 of one embodiment of the present invention, and a schematic cross-section of a selected portion 180 of the glove 171.

The partial cross section 180 of the glove is shown as taken on a line 175. The partial cross section 180 of a glove shows a top portion 185 of a glove and a lower portion 190 of a glove separated by a space 195 for a hand. The top portion 185 of the glove is shown as having an outer protective layer 205 and an inner protective layer 210 between which are a sandwich of metal mesh layers 125 between first-textile layers 121 and second-textile layers 122. The lower portion 190 of a glove is similarly shown as having an outer protective layer 205 and an inner protective layer 210 between which are a sandwich of metal mesh layers 125 between first-textile layers 121 and second-textile layers 122.

Figure 3:
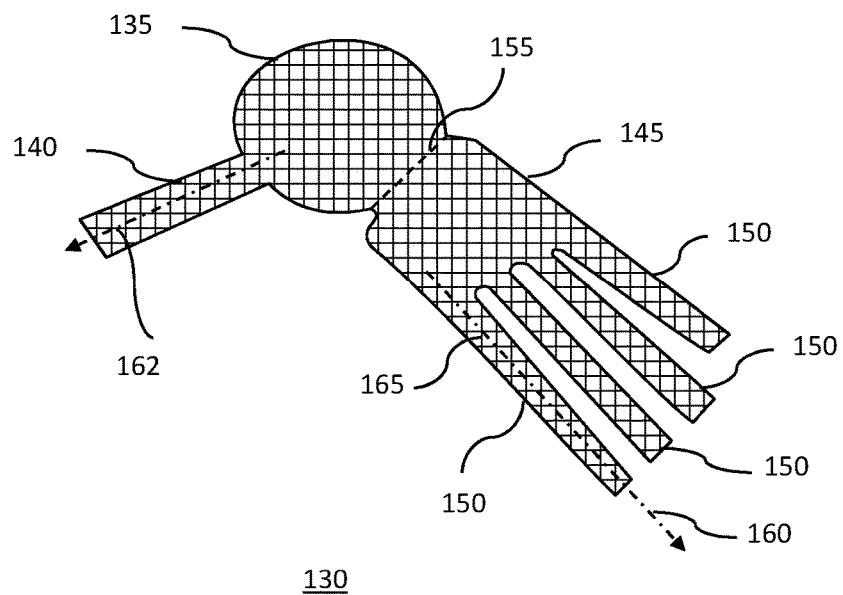
FIG. 3 shows a schematic, plan view of an elephant-pattern cut-out of one embodiment of the present invention.

FIG. 3 shows a schematic, plan view of an elephant-pattern 130 cut-out of one embodiment of the present invention.

The elephant-pattern 130 may, for instance, have a first palm region 135 with an integral thumb extension 140 that may be attached via a lower palm edge 155, to a second palm region 145 having one or more finger extensions 150. The attachment of the first palm region 135 to the second palm region 145 may, for instance, be via a lower palm edge 155.

In a preferred embodiment of the present invention, the fabric to be cut into the elephant-pattern 130 may be arranged such that one or more of the finger extensions 150 are bias-cut 165 with respect to a direction 160 of that finger extension. Such an arrangement may have the advantage of increased flexibility of the finger portion of the glove.

In a preferred embodiment of the elephant-pattern 130, the shape is such that when the fabric is arranged such that one or more of the finger extensions are bias-cut with respect to the direction of that finger extension, the thumb extension 140 is also bias cut with respect to a direction 162 of the thumb extension.

In a preferred embodiment, the bias-cut may only be used for the metal mesh layers 125 as bias-cutting tends to produce more waste. There may, however, be situations where the additional flexibility introduced by bias-cutting makes it a preferred method even for one or more of the first-textile layers 121, and/or the second-textile layer 122.

Figure 4:
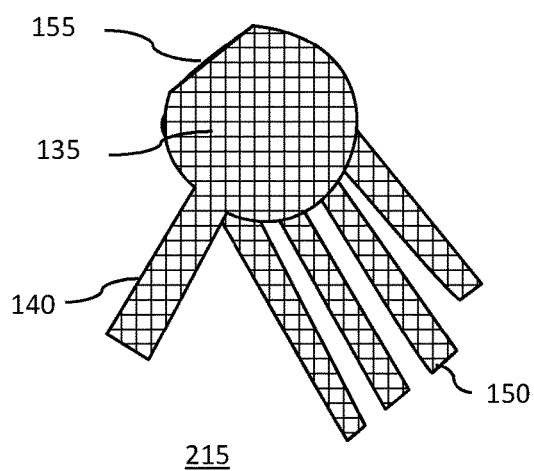
FIG. 4 shows a schematic, plan view of a folded, elephant pattern layer of one embodiment of the present invention.

FIG. 4 shows a schematic, plan view of a folded, elephant pattern layer 215 of one embodiment of the present invention.

The folded, elephant pattern layer 215 is shown folded along a lower palm edge 155 that joins the two palm regions of the elephant pattern so that the structure is now ready to be used in a glove. The folded, elephant pattern layer 215 has the added advantage that the palm region of the glove, which may be the most vulnerable portion of the glove with respect to puncture, has a double layer of metal mesh.

Figure 5:
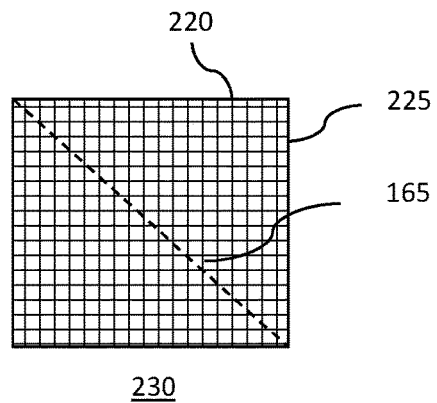
FIG. 5 shows a schematic view of a bias-cut on a woven fabric.

FIG. 5 shows a schematic view of a bias-cut on a fabric 230. As shown, the bias-cut 165 is at approximately forty-five degrees with respect to both the warp thread 220 and the weft thread 225 of the fabric.

Figure 6:
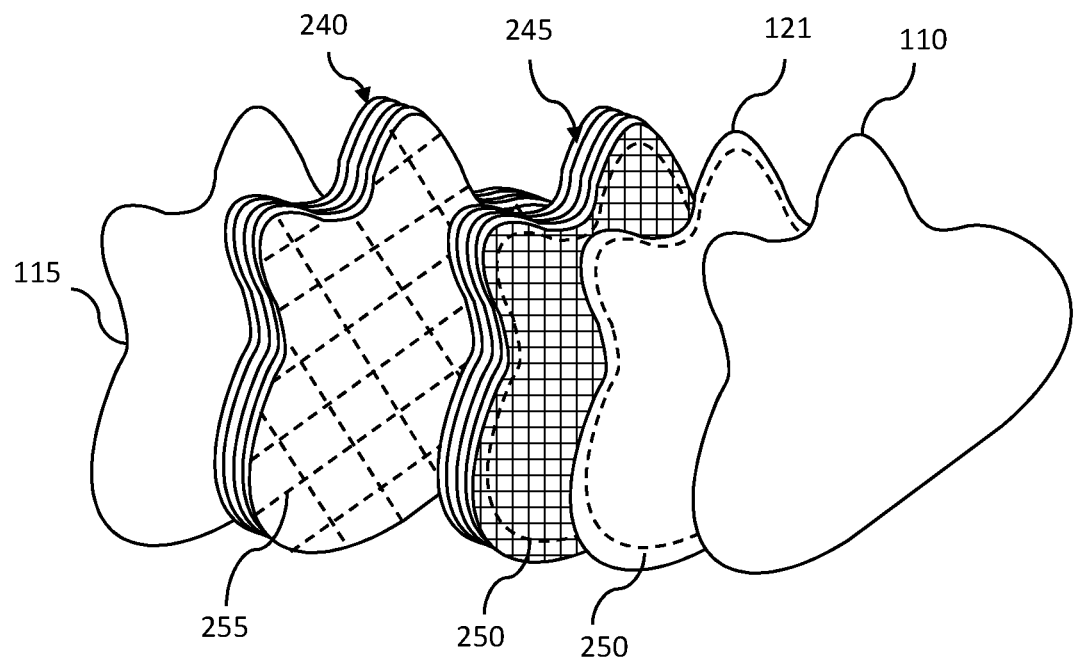
FIG. 6 shows a schematic, exploded isometric view of the components of a portion of a protective vest of one embodiment of the present invention.

FIG. 6 shows a schematic, exploded isometric view of the components of a portion of a protective vest 260 of one embodiment of the present invention.

As shown in FIG. 6, a chest or back portion of a protective vest 260 may have an outer protective layer 115, a plurality, or first bundle of textile layers 240 adjacent to the outer protective layer 115, a plurality, or first bundle, of metal mesh layers 245 and an inner protective layer 110. When the garment is worn with the inner protective layer 110 closest to the wearer, and the first bundle of textile layers 240 and the outer protective layer 115 furthest from the wearer, this arrangement may provide good protection against a ballistic attack on the wearer.

The outer and inner protective layers may be made of a suitably wearable fabric such as, but not limited to, cotton, denim, wool, silk, linen, bamboo, or some combination thereof.

The plurality, or first bundle of textile layers 240 may be joined to each other by stitching extending across the interior 255. The plurality, or bundle, of metal mesh layers 245 may, in contrast, be joined to each other by being peripherally sewn 250. The joining may also or instead be accomplished by a means such as, but not limited to, gluing, welding, stapling, or some combination thereof.

In a preferred embodiment, the plurality, or bundle, of metal mesh layers 245 may also have one or more textile layers attached to them by being peripherally sewn 250. These layers may be on either side of the plurality, or bundle, of metal mesh layers 245 or on both sides. The textile layers peripherally attached to the peripherally sewn 250 may, for instance, provide enhanced protection against puncture attacks such as, but not limited to, stab, cut, slash and needle attacks, or some combination thereof.

In a preferred embodiment of the present invention there may be between 20 and 28 textile layers and between 8 and 12 metal mesh layers, and in a more preferred embodiment there are 24 textile layers and 10 metal mesh layers.

One of ordinary skill in the art will, however, appreciate that the protective, composite fabric illustrated in FIG. 6 and described above may be used in a variety of other protective garments. For instance, trousers or legging made incorporating such a material may, for instance, offer significant protection against puncture attacks such as those of industrial cutting machinery such as, but not limited to, a chainsaw. Similarly, the material, or variants of it, may be incorporated into other items of protective apparel such as, but not limited to, shoes, boots, gloves, head-gear or sleeves.

Figure 7:
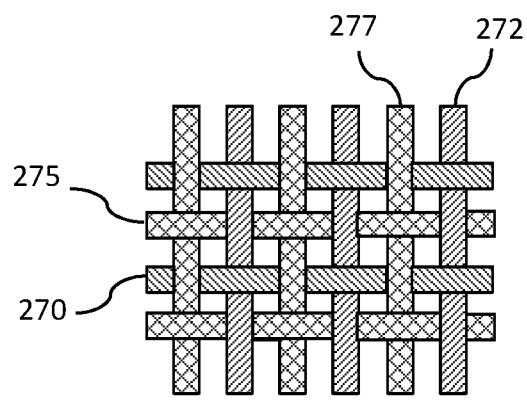
FIG. 7 shows a schematic plan view of an inter-woven fiber fabric of one embodiment of the present invention.

FIG. 7 shows a schematic plan view of an inter-woven textile/metal fiber fabric 265 of one embodiment of the present invention.

As discussed above, applicant noted an unexpected 30-40% increase in the puncture resistance when particular textile layers are combined with metal mesh layers A similar synergy of the properties of metal and textile fibers may, therefore, also be possible by weaving the fibers into a single layer of fabric.

Figure 8:
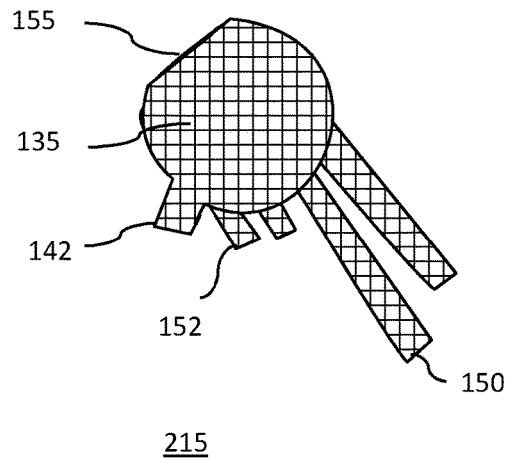
FIG. 8 shows a schematic, plan view of a folded, elephant pattern layer of one embodiment of the present invention having a truncated thumb extension and truncated finger extensions.

FIG. 8 shows a schematic, plan view of a folded, elephant pattern layer of one embodiment of the present invention having a truncated thumb extension and truncated finger extensions.

The folded, elephant pattern layer 215 of FIG. 8 is shown as having a first palm region 135 with a truncated thumb extension 142. The pattern may be folded at a lower palm edge 155 that may be connected to a second palm region (not shown in this view) that may have one or more finger extensions 150 and one or more truncated finger extensions 152 attached to it.

A purpose of having one or more metal mesh layers or one more textile layers of the protective material having either a truncated finger or thumb extension may be to allow additional flexibility of a wearer's corresponding digits. The glove may, for instance, be used by an agent wanting to use a firearm while wearing the glove. Having additional flexibility and less bulk in the thumb and index fingers of a glove may, for instance, allow a wearer to hold and fire a pistol more easily.

In an alternate version of the glove with truncated protection, there may be additional pieces of material sized and shaped to cover the remainder of the finger of thumb but that are disconnected from the rest of the elephant pattern. In that manner, flexibility may be maintained while protection may be provided for the majority of the thumb and finger.

Figure 9A:
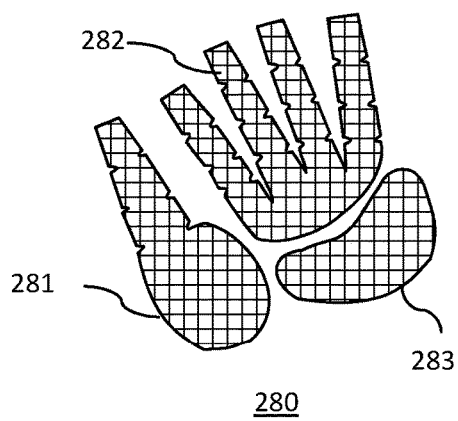
FIG. 9A shows a schematic, plan view of a fan, 3-piece glove pattern cut-out of one embodiment of the present invention.

FIG. 9A shows a schematic, plan view of a fan, 3-piece glove pattern 280 cut-out of one embodiment of the present invention.

As shown, the fan, 3-piece glove pattern 280 may have a thumb piece of a fan glove pattern 281, a fingers piece of a fan glove pattern 282 and a palm piece of a fan glove pattern 283. The fan, 3-piece glove pattern 280 may be used to cut either textile layers or metal mesh layers, or both. In a preferred embodiment, the fan, 3-piece glove pattern 280 pieces may be arranged such that either, or both, of the thumb and finger extensions are bias-cut for reasons such as those described above.

Figure 9B:
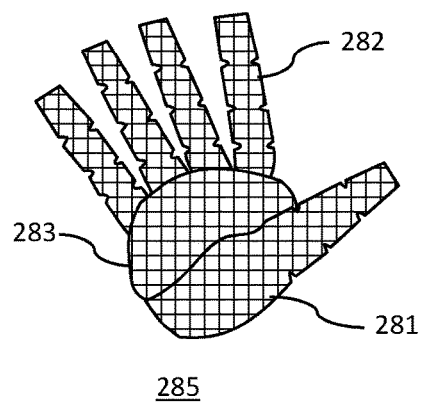
FIG. 9B shows a schematic, plan view of an assembled fan, 3-piece glove pattern of one embodiment of the present invention.

FIG. 9B shows a schematic, plan view of an assembled fan, 3-piece glove pattern 285 of one embodiment of the present invention. The thumb piece 281, the fingers piece 282 and the palm piece 283 may be assembled together by any suitable means such as, but not limited to, stitching, gluing, stapling, welding, spot gluing, spot stitching, spot welding or some combination thereof. The pieces may also, or instead, be held in place by suitably shaped inner and outer protective layers that may be joined peripherally by, for instance, stitching, or which may be joined by stitching that extends across the interior of the pattern.

Figure 10A:
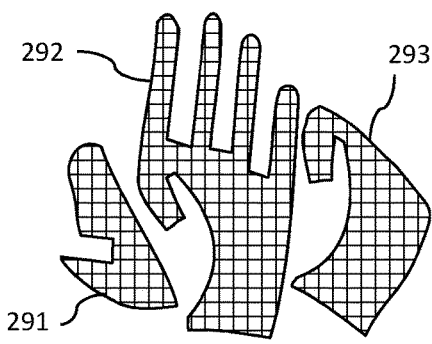
FIG. 10A shows a schematic, plan view of a turkey, 3-piece glove pattern cut-out of one embodiment of the present invention.

FIG. 10A shows a schematic, plan view of a turkey, 3-piece glove pattern 290 cut-out of one embodiment of the present invention.

As shown, the turkey, 3-piece glove pattern 290 may have a thumb piece of a turkey glove pattern 291, a fingers piece of a turkey glove pattern 292 and a palm piece of a turkey glove pattern 293. The fan, 3-piece glove pattern 290 may be used to cut either textile layers or metal mesh layers, or both. In a preferred embodiment, the turkey, 3-piece glove pattern 290 pieces may be arranged such that either, or both, of the thumb and finger extensions are bias-cut for reasons such as those described above.

Figure 10B:
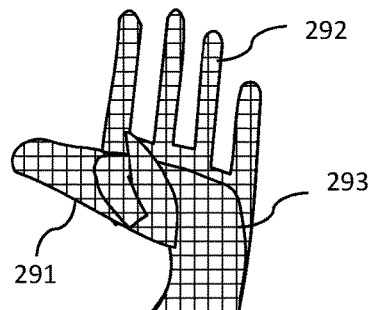
FIG. 10B shows a schematic, plan view of an assembled turkey, 3-piece glove pattern of one embodiment of the present invention.

FIG. 10B shows a schematic, plan view of an assembled turkey, 3-piece glove pattern second pivot 295 of one embodiment of the present invention. The thumb piece 291, the fingers piece 292 and the palm piece 293 may be assembled together by any suitable means such as, but not limited to, stitching, gluing, stapling, welding, spot gluing, spot stitching, spot welding or some combination thereof. The pieces may also, or instead, be held in place by suitably shaped inner and outer protective layers that may be joined peripherally by, for instance, stitching, or which may be joined by stitching that extends across the interior of the pattern.

Figure 11:
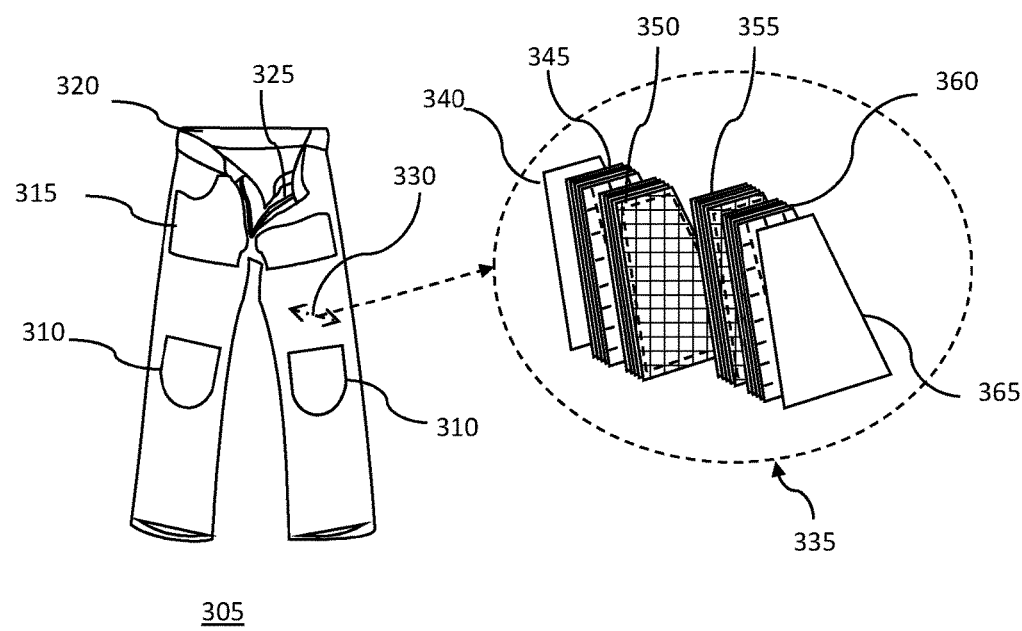
FIG. 11 shows a schematic, front view of a protective pants of one embodiment of the present invention along with a schematic view of a composite fabric construction at a line of section.

FIG. 11 shows a schematic, front view of a pair of protective pants 305 of one embodiment of the present invention along with a schematic view of a composite fabric construction 355 viewed at a line 330.

The protective pants 305 may, for instance, be of a conventional design having features such as, but not limited to, a pant belt 320 and a zipper fastener 325 or some combination thereof. The protective pants 305 may be fabricated in whole or in part of a composite fabric of the present invention having a composite fabric construction 335 as illustrated schematically in FIG. 11.

The composite fabric construction 335 may, for instance, be illustrative of the construction at line of section 330 on the protective pants. The composite fabric construction 335 may include an inner lining fabric 340, an inner, or first, textile layer bundle 345, an inner, or first, metal mesh bundle 350, an outer, or second, metal mesh bundle 355, an outer, or second, textile layers bundle 360 and an outer lining fabric 365.

In a preferred embodiment, the first, textile layer bundle 345 and the first, metal mesh bundle 350 may be joined together, but may be separate from the second, metal mesh bundle 355 and the first, metal mesh bundle 350, which may themselves be joined together. The two separated, inner, or first, and outer, or second, groups of bundles may then be sandwiched between the inner lining fabric 340 and the outer lining fabric 365 which may be joined at the periphery of the sections making up the garment.

The textile bundle layers may, for instance, be joined to each other by stitching extending across the interior of said textile layers, while the metal mesh bundle layers may, for instance, be joined by stitching along a periphery of the metal mesh layers.

In an alternative embodiment, the inner and outer linings may also be joined directly to the inner and outer groups of fabric bundles.

The inner and outer metal mesh bundles may be made of woven stainless steel fibers, and may comprise metal mesh layers having fiber composition and characteristics of some or all of the metal meshes described above.

In a preferred embodiment of the present invention, each of the inner and outer textile layer bundles and the inner and outer metal mesh bundle may have 3 to 8 layers of fabric. In a further preferred embodiment of the invention, each of the inner and outer textile bundles and the inner and outer metal mesh bundle may have 5 layers of fabric, with the textile layers being woven from fibers having a fiber dernier of 2 dtex or less that may be bundled, for weaving, into a yarn having 500 or more fibers, and the metal mesh layer being made of woven mesh of stainless steel fibers having a diameter of 0.2 mm or less and a mesh aperture of 0.45 mm or less.

As shown in FIG. 11, the protective pants 305 may include regions of extra protection such as, but not limited to, the knee region of additional protection 310 and/or the crotch region of additional protection 315. Having regions of extra protection may, for instance, allow garments to be made cost effectively while providing the desired levels of protection in the regions most in need of protection.

Figure 12:
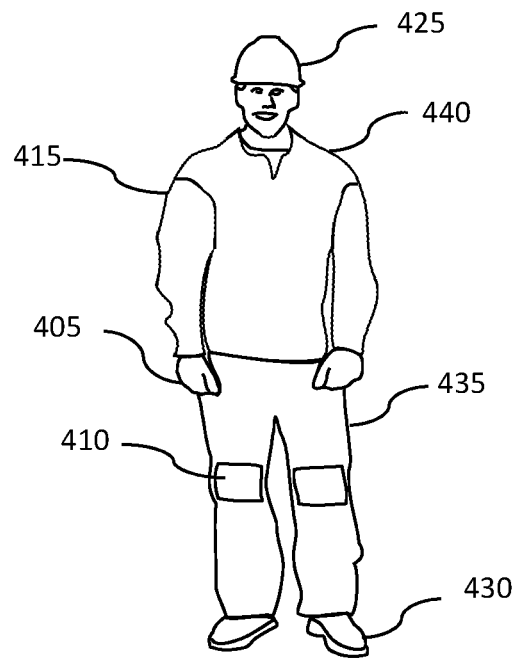
FIG. 12 shows a schematic, front view of human wearable, protective garment embodied in the present invention being worn.

FIG. 12 shows a schematic, front view of human wearable, protective garments embodied in the present invention being worn.

The human wearable, protective outfit 101 may, for instance, include a variety of items made using the composite fabrics described above such as, but not limited to, a helmet 425, protective sleeves 415, a protective jacket 440, gloves 405, a leg protector leg protector 435, knee protection devices 410 and protective shoes 430.

Figure 13:
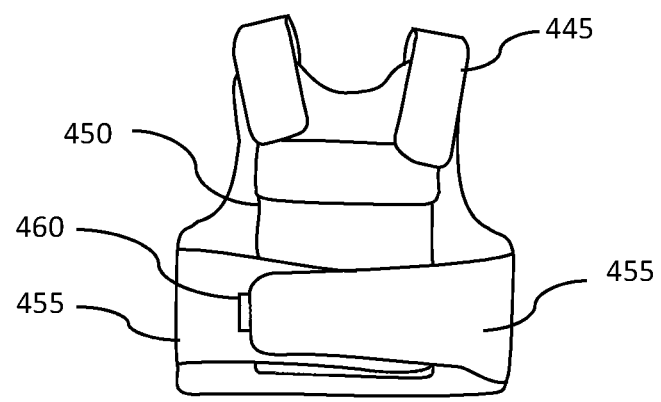
FIG. 13 shows a schematic, front view of a protective vest of one embodiment of the present invention.

FIG. 13 shows a schematic, front view of a protective vest of one embodiment of the present invention.

The protective vest 420 may, for instance, include various parts made of the composite materials described above such as, but not limited to, a shoulder harness 445, a protective plate pouch 450 and fastening straps 455. The protective vest 420 may also incorporate other materials such as, but not limited to, hook and loop fastening material 460.

Various embodiments of the present invention have been described above primarily with reference to garments that are protective gloves, protective vests, protective trousers and protective leggings. One of ordinary skill in the art will, however, appreciate that the materials and methods of the invention described above may all also be applied to a wide range of protective garments including, but not limited to, protective headgear, protective sleeves, protective knee guards, protective shoe covers, protective shoe soles and protective boots. In addition, the materials described above may be used to provide protective garments for animals such as, but not limited to, police dogs and horses. In addition the materials described above may also be used to provide protective structures for protecting vulnerable items such as, but not limited to, portable electronic devices, computers, piping, electronics, portions of vehicles and liquid carrying containers.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A human wearable glove, comprising:
    an inner protective layer;
    an outer protective layer;
    one or more first-textile layers, said first-textile layers comprising yarn comprised of fibers selected from one of a meta-aramid fiber, an ultra-high molecular weight polyethylene fiber, a polyethylene terephthalate fiber, a cellulose fiber, a polyamide fiber, a mixture of para-aramid fibers and meta-aramid fibers and a mixture of para-aramid fibers and carbon fibers, or a combination thereof, and wherein said first-textile layer is from said fibers by one the methods selected from weaving, knitting, crocheting, knotting, and felting, or a combination thereof;
    one or more metal mesh layers, said metal mesh layers comprising metal fibers selected from one of a fiber comprised of Aluminum, Beryllium, Chromium, Cobalt, Copper, Erbium, Gold, Indium, Iron, Lead, Manganese, Nickel, Platinum, Potassium, Silver, Tantalum, Tin, Titanium, Tungsten, Uranium, Zinc, Stainless Steel, and Zirconium, or some combination or alloy thereof, and, wherein, said metal mesh layer is shaped in the form of an elephant-pattern, said elephant-pattern comprising a first palm region having a thumb extension, and a second palm region having four finger extensions and wherein said first and second palm regions are joined along a lower palm edge, and wherein said metal mesh layer is bias-cut with respect to a direction of at least one of said finger extensions and wherein said metal mesh layer is folded along a lower palm edge of said elephant-pattern when located within said glove; and
    wherein said first-textile layer and said metal mesh layer are sandwiched between said inner and outer protective layers, and wherein said inner and outer protective layers are joined at a periphery of said protective layers.

2. The glove of claim 1, wherein, said first-textile layer is formed by said method of weaving; said yarn is comprised of 10 dtex or less fibers of ultra-high molecular weight polyethylene fiber; and said metal mesh layer is comprised of stainless steel fibers having a diameter of 0.2 mm or less and a mesh aperture of 0.45 mm or less.

3. The glove of claim 1, wherein, said first-textile layer is formed by said method of weaving; said yarn is comprised of 10 dtex or less fibers of polyethylene terephthalate fiber; and said metal mesh layer is comprised of stainless steel fibers having a diameter of 0.2 mm or less and a mesh aperture of 0.45 mm or less.

4. The glove of claim 3 wherein said outer layer is comprised of one of a latex, a neoprene, a nitrile and a vinyl.

5. The human wearable, glove of claim 1, further comprising:
    one or more second-textile layer, said second-textile comprising yarn comprised of para-aramid fibers; and
    wherein said metal mesh layer is sandwiched between said first-fabric and said second-fabric layer, which in turn are sandwiched between said inner and outer protective layers, and wherein said inner and outer protective layers are joined at a periphery of said protective layers.

6. The human wearable, glove of claim 1, wherein,
    said first-textile layer comprises yarn comprised fibers comprised of one of a para-aramid fiber, a meta-aramid fiber, a polyethylene terephthalate fiber, a cellulose fiber, a polyamide fiber, a mixture of para-aramid fibers and meta-aramid fibers and a mixture of para-aramid fibers and carbon fibers; and,
    further comprising,
    one or more second-textile layers comprising yarn comprised of ultra-high molecular weight polyethylene fiber; and
    wherein said metal mesh layer is sandwiched between said first-fabric and said second-fabric layer, which in turn are sandwiched between said inner and outer protective layers, and wherein said inner and outer protective layers are joined at a periphery of said protective layers.

7. The human wearable glove of claim 6, wherein, said first-textile layer is formed by said method of weaving; said yarn is comprised of 10 dtex or less fibers of ultra-high molecular weight polyethylene fiber; and said metal mesh layer is comprised of stainless steel fibers having a diameter of 0.2 mm or less and a mesh aperture of 0.45 mm or less.

8. The glove of claim 6, wherein, said first-textile layer is formed by said method of weaving; said yarn is comprised of 10 dtex or less fibers of polyethylene terephthalate fiber; and said metal mesh layer is comprised of stainless steel fibers having a diameter of 0.2 mm or less and a mesh aperture of 0.45 mm or less.

\* \* \* \* \*